(12) United States Patent
Lambert

(10) Patent No.: US 8,087,129 B2
(45) Date of Patent: Jan. 3, 2012

(54) HINGES AND PARTS THEREFOR

(75) Inventor: John F. Lambert, Cheltenham (GB)

(73) Assignee: Securistyle Limited, Cheltenham (GB)

( * ) Notice: Subject to any disclaimer, the term of this patent is extended or adjusted under 35 U.S.C. 154(b) by 437 days.

(21) Appl. No.: 12/293,007

(22) PCT Filed: Mar. 12, 2007

(86) PCT No.: PCT/GB2007/000817
§ 371 (c)(1),
(2), (4) Date: Sep. 15, 2008

(87) PCT Pub. No.: WO2007/104936
PCT Pub. Date: Sep. 20, 2007

(65) Prior Publication Data
US 2009/0133220 A1    May 28, 2009

(51) Int. Cl.
*E05D 3/06* (2006.01)
(52) U.S. Cl. .............................. 16/366; 16/368; 16/370
(58) Field of Classification Search .................. 16/366, 16/368, 369, 370, 357, 358, 359, 360, 361, 16/227; 49/405; 160/84.09, 84.11, 136
See application file for complete search history.

(56) References Cited

U.S. PATENT DOCUMENTS

| | | | | | |
|---|---|---|---|---|---|
| 1,484,093 | A | * | 2/1924 | Soss | 16/358 |
| 1,682,860 | A | * | 9/1928 | Soss | 16/358 |
| 1,687,271 | A | * | 10/1928 | Soss | 16/358 |
| 1,688,996 | A | * | 10/1928 | Soss | 16/358 |
| 1,693,004 | A | * | 11/1928 | Soss | 16/358 |
| 2,021,702 | A | * | 11/1935 | Soss | 16/369 |
| 2,040,279 | A | * | 5/1936 | Soss | 16/273 |
| 2,178,271 | A | * | 10/1939 | Soss | 16/358 |
| 2,227,849 | A | * | 1/1941 | Soss | 16/359 |
| 2,608,713 | A | * | 9/1952 | Soss | 16/337 |
| 2,824,735 | A | | 2/1958 | Stavenau et al. | |
| 2,983,948 | A | * | 5/1961 | Simons | 16/358 |
| 3,001,224 | A | * | 9/1961 | Soss | 16/276 |
| 3,098,647 | A | | 7/1963 | Teggelaar et al. | |
| 3,508,362 | A | | 4/1970 | Wright | |
| 3,881,221 | A | * | 5/1975 | Schmidt | 16/366 |
| 4,833,754 | A | * | 5/1989 | Yang | 16/339 |
| 5,097,629 | A | | 3/1992 | Guhl et al. | |
| 5,205,074 | A | | 4/1993 | Guhl et al. | |
| 5,272,837 | A | | 12/1993 | Nolte et al. | |
| 5,435,103 | A | | 7/1995 | Lauesen et al. | |
| 5,735,021 | A | * | 4/1998 | Briggs | 16/369 |

(Continued)

FOREIGN PATENT DOCUMENTS

DE       2237669       7/1972

(Continued)

*Primary Examiner* — Victor Batson
*Assistant Examiner* — Jeffrey O Brien
(74) *Attorney, Agent, or Firm* — Allen, Dyer, Doppelt, Milbrath & Gilchrist, P.A.

(57) ABSTRACT

A parallel opening hinge (1) comprises a first track (3), a second track (5) and at least two pairs of pivotally connected crossing links (7, 9), wherein each pair of crossing links (7, 9) is mounted to the tracks (3, 5) via a fixed pivot (13, 17) and a movable pivot (15, 19) in each track (3, 5), wherein a connector (23) joins two movable pivots (15) in a track (5) such that the movable pivots (15) move together. Improved opening of a parallel opening vent can thereby result. Other improved features of a parallel opening hinge are also described.

7 Claims, 5 Drawing Sheets

U.S. PATENT DOCUMENTS

| | | | |
|---|---|---|---|
| 5,832,668 A | 11/1998 | Faubert et al. | |
| 6,044,587 A | 4/2000 | Vetter et al. | |

FOREIGN PATENT DOCUMENTS

| | | |
|---|---|---|
| DE | 9214897 | 3/1993 |
| DE | 19741728 | 1/1999 |
| EP | 0199578 | 10/1986 |
| EP | 1288417 | 5/2003 |
| GB | 220905 | 8/1924 |
| GB | 233123 | 5/1925 |
| GB | 435915 | 10/1935 |
| GB | 2069037 A * | 8/1981 |
| GB | 2149450 | 6/1985 |
| GB | 2225050 | 5/1990 |
| GB | 2228973 | 12/1990 |
| GB | 2379248 | 5/2003 |
| JP | 2217778 | 11/1989 |
| JP | 02261183 A * | 10/1990 |
| WO | 9842941 | 10/1998 |

* cited by examiner

HINGES AND PARTS THEREFOR

CROSS-REFERENCE TO RELATED APPLICATION

This application is a National Phase entry from PCT/GB2007/000817, having an international filing date of Mar. 12, 2007 and a priority date of Mar. 16, 2006.

The present invention relates to hinges for vents and parts therefor. In particular, the present invention relates to parallel opening hinges and improvements thereto.

Parallel opening hinges are well known. For example, please refer to the current applicants' earlier European patent No. 0968349.

When a heavy window sash, say perhaps between 100-200 kilograms in weight, is to be supported for opening parallel to a fixed frame, a number of parallel opening hinges are typically used. For example, the long sides of the vent may use two or even more separate parallel hinges and the shorter sides of the vent may use one or two separate parallel hinges to support and control the opening of the vent. Although these systems work, it has been noted that the weight of a sash can cause a certain amount of dropping and falling out of the upper part of the sash relatively to the fixed frame. This can result in the vent opening out of parallel and being unsightly, and is certainly not ideal. Also, due to the weight of sashes now being carried by parallel hinges, a certain degree of "crabbing" can occur as a slider moves along a track of a parallel hinge during opening and/or closing of the vent. Once again, this is not ideal and essentially spoils the smooth running of the hinge system whether it be driven by manual operation or an electric motor. It has also been noted that too much free play in a central pivot joint between two links of a parallel opening hinge can also reduce the smooth operation of the hinge system.

The present invention aims to improve upon the above problems by providing a new parallel opening hinge arrangement and a number of component parts therefor.

In view of the foregoing, the present invention provides a parallel opening hinge comprising a first track, a second track and at least two pairs of pivotally connected crossing links, wherein each pair of crossing links is mounted to the tracks via a fixed pivot and a movable pivot in each track, wherein a connector joins two movable pivots in a track such that the movable pivots move together.

By causing the two movable pivots of what are essentially adjacent parallel hinges to move together helps to prevent the top part of a sash from falling outwards. Indeed, the use of the connector results in both parallel hinges moving at the same time to the same extent, thereby resulting in almost perfect parallel opening of a vent.

Although the present invention will function with only one connector acting in one track of a parallel opening hinge arrangement, improved opening may result if each track of a parallel opening hinge system has its own connector for joining movable pivots in its respective track. Furthermore, if more than two parallel hinges are accommodated in a pair of tracks, a connector can act between two or more of the movable pivots in each parallel track.

In a typical parallel opening hinge, the movable pivots are preferably slider blocks which are accommodated within the track. As will be appreciated, the connector is preferably a tie bar attached to the movable pivots, wherein the tie bar is situated and moved within the track. Alternatively, it would be possible for the connector to be connected to a movable pivot and pass out of the bottom of the track and along the underside of the track before re-entering the track to connect to the next movable pivot.

If the connector is accommodated within a track, the connector preferably has slots to accommodate other components, such as other pivot points and screw mounting heads for example, within the hinge.

The connector can be attached to a movable pivot via a rivet. Alternatively, the connector may be attached to a movable pivot via a shaped connection, such as a jigsaw type arrangement, or a snap-fit, for example. Other forms of connection will, of course, be appreciated by those skilled in the relevant art.

The track preferably has a base and two side walls having inwardly facing flanges substantially parallel to the base. This is a typical C-shaped cross-section track known in the prior art. As will be appreciated, the flanges retain the movable pivots/slider blocks within the track.

The present invention further provides a new and improved mounting block for use in a track of a hinge, the mounting block being shaped to be received and retained within the track, wherein the mounting block includes a plurality of roller balls for abutting the track in use.

In the prior art, slider blocks were able to move freely along a track and provided good support for a sash. However, now that much heavier sashes are being supported, it has been necessary to invent a new form of mounting block, and this has resulted in the present invention which uses roller balls.

Preferably the mounting block includes at least one aperture for receiving a pivot pin to connect the block to a link of a hinge. The block may also include a second aperture for receiving a connector to link the mounting block to another mounting block in a parallel opening hinge system as herein described. Alternatively, some other connection arrangement may be provided on the mounting block.

The mounting block preferably includes a body and a skin overlaying the body to prevent the body from contacting the track in use. This is particularly useful when the body is manufactured from metal and the skin is a plastics skin, since not only does the plastics skin result in less friction between the mounting block and the track, but the plastics skin can readily incorporate cut out regions to accommodate the roller balls. Thus, the roller balls can abut both the metal track and the metal body of the mounting block, to transfer the weight of the sash directly therebetween.

In a preferred embodiment, the mounting block is substantially rectangular and the roller balls are located towards the four corners of the mounting block on the sides of the block which abut the sides of the track. If appropriate, more than four roller balls may be incorporated.

The roller balls are preferably manufactured from metal, but some other suitable material could alternatively be used.

The present invention further provides a pivot mount for a link of a hinge, the pivot mount comprises a support block and a pivot pin engaging the support block, wherein the pivot pin includes a cam surface for abutting a link of a hinge in use to move the link relative to the block.

By incorporating a pivot mount of this kind in a hinge, particularly a parallel opening hinge, any dropping of the sash relative to the fixed frame can be accommodated during installation by adjusting the cam position to lift the sash. This has been found to be a surprisingly useful invention.

The pivot pin preferably has a shaft for engaging the support block.

The cam surface is preferably circular and offset from the axis of the shaft of the pivot pin. Further, the diameter of the circle defining the cam surface is preferably larger than the diameter of the shaft of the pivot pin, thereby allowing a significant amount of movement of a sash mounted on the parallel opening hinge to be achieved. Essentially, rotation of the cam surface adjusts the position of the track carrying the sash relative to the remainder of the parallel hinge.

Preferably, the pivot pin includes a head for retaining a link on the block, in use. One or more washer may also be used, as necessary. Further, the head of the pivot pin is preferably shaped to receive a tool, such as an allen key or screw driver, to rotate the pivot pin during installation.

The present invention also provides a hinge for a vent incorporating a mounting block and/or a pivot mount as described and claimed herein.

As mentioned above, the central pivot joint between two links of a parallel opening hinge can provide a region of too much free play, which can be detrimental to the functioning of the parallel opening hinge. Thus, the present invention further provides a pivot between two links of a hinge, the pivot including a fastener holding the links together and a bush acting on the fastener to define a spacing between the links. By including the bush, which is ideally a good fit through the links, a pivot arrangement is produced wherein axial free play along the fastener can be minimized. As a result, smoother operation of the pivot can result, thereby improving the opening of a parallel hinge, for example.

The bush preferably includes a shoulder for abutting a surface of a link. The surface of the link is preferably a recessed surface, so that both the shoulder of the bush and the associated part of the fastener can be accommodated within the recess.

At the other end of the bush, the bush preferably abutts a head of the fastener, thereby defining the length of the fastener during assembly. More preferably, the head of the fastener is accommodated in a recess in one of the links. Thus, the complete pivot can be accommodated within the profile of the two adjacent links.

The fastener preferably passes through the bush and, if the fastener is a rivet, is crushed outwardly and over the shoulder of the bush during assembly.

The bush is preferably rigid and acts as a bearing for the two links. Phosphor bronze is a very good bearing material, which also has good strength and rigidity. Other suitable materials can, of course, alternatively be used. As will be appreciated, a washer is ideally used between the two links outside the bush to prevent wear between the links. Hence, the bush must have sufficient length to accommodate this washer, which is preferably nylon or other suitable material.

Specific embodiments of the present invention are now described, by way of example only, with reference to the accompanying drawings in which.

Figure 1:
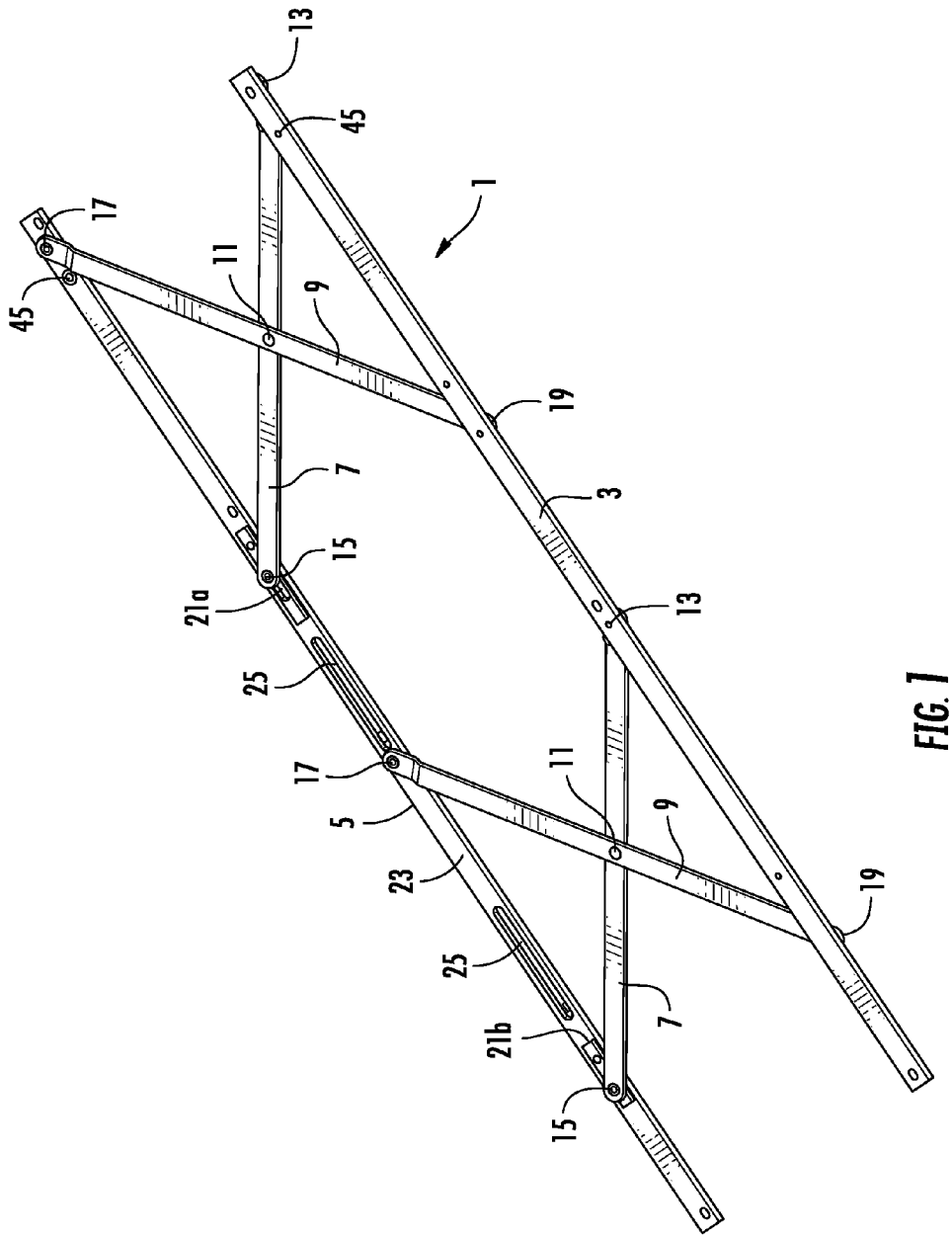
FIG. 1 is a perspective view of a parallel opening hinge according to the present invention in an open position.
Figure 2:
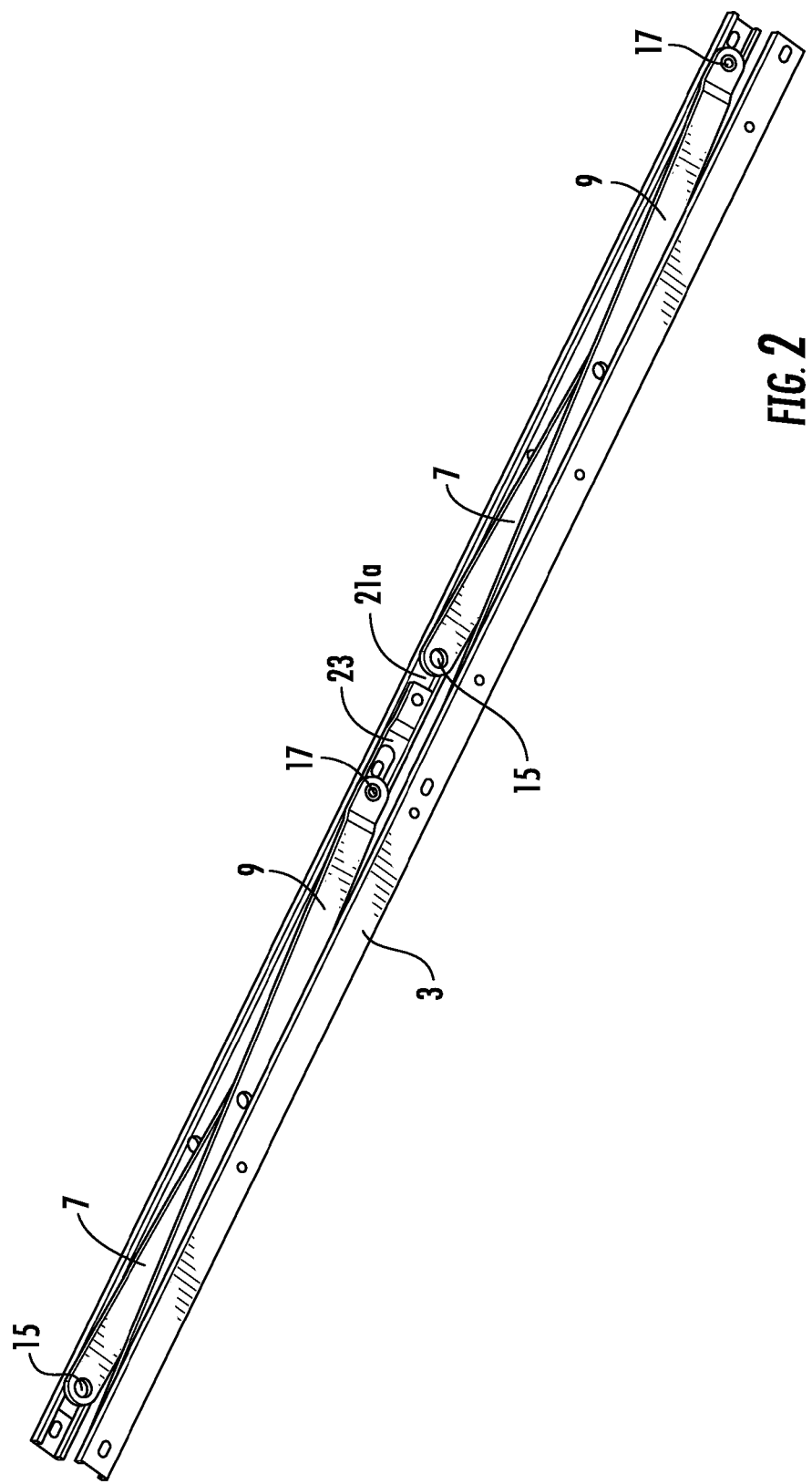
FIG. 2 is a perspective view of the hinge of FIG. 1 in a closed position.

With reference to FIGS. 1 and 2 of the accompanying drawings, a parallel opening hinge system 1 is shown. As will be seen, the hinge system effectively incorporates two parallel hinge arrangements in a single product. The new parallel hinge includes a pair of parallel tracks 3, 5 each having essentially a c-shaped cross-section with a base and two side walls having inwardly facing flanges substantially parallel to the base. The hinge 1 further includes two pairs of crossing links 7, 9, wherein each pair of crossing links 7, 9 is pivotally connected at a pivot 11 and to each track 3, 5. The links 7 are attached to track 3 at fixed pivot points 13 and to track 5 at movable pivot points 15. Similarly, the links 9 are attached to track 5 at fixed pivot points 17 and to track 3 at movable pivot points 19. Thus, as the parallel tracks 3, 5 are moved together or apart, the movable pivots 15, 19 travel along the tracks whereas the fixed pivots 13, 17 remain fixed.

Figure 3:
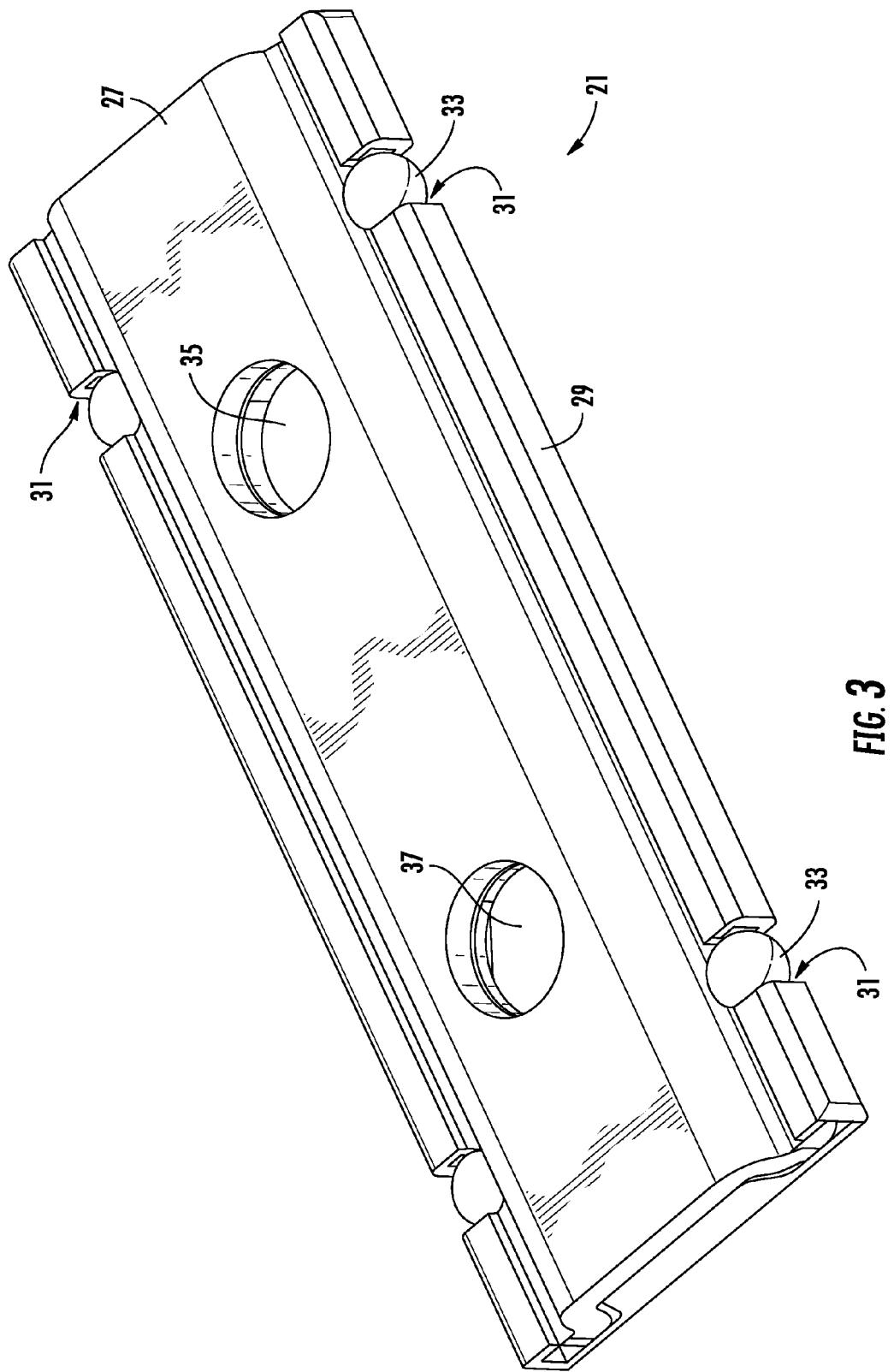
FIG. 3 is a perspective view of a mounting block according to the present invention.
Figure 4:
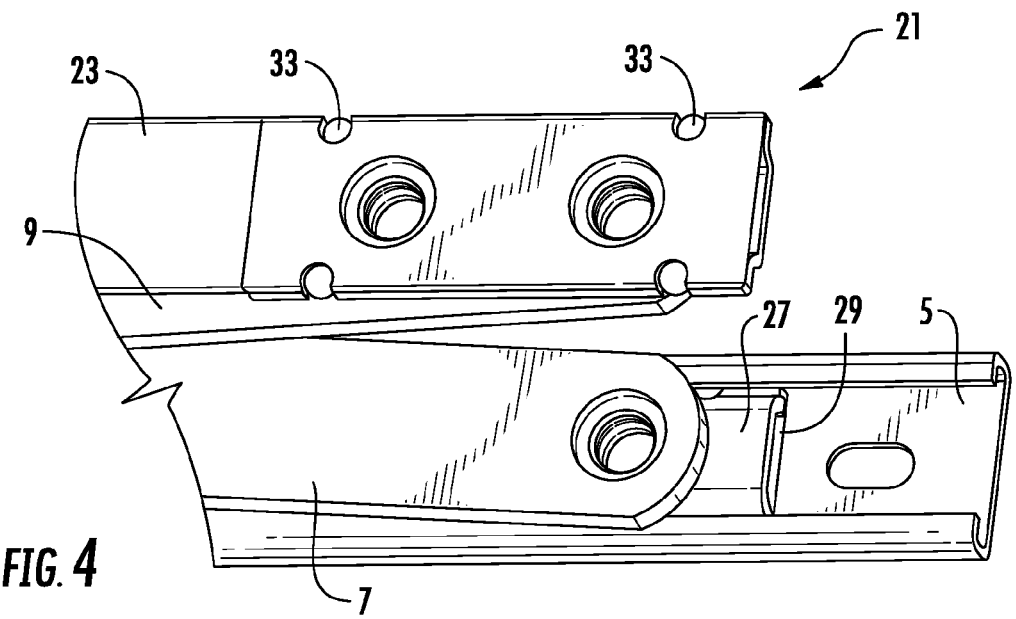
FIG. 4 is a perspective view showing a part of a parallel opening hinge with one of the tracks removed to show the mounting block of FIG. 3 in use.

As will be seen in FIG. 1, the movable pivots 15 are carried by mounting blocks 21 shown in more detail in FIGS. 3 and 4. These mounting blocks 21 are shaped to be received and retained within the c-shaped cross-sectioned tracks 3, 5. Between the two mounting blocks 21 in track 5, for example, a connector or tie rod 23 is provided for tying the two sliders 21 together, so that they move as one. The connector 23 is joggled at one end to ride over the mounting block 21 and be riveted thereto. The connector 23 then travels along the bottom of the track 5 avoiding pivot 17 by virtue of a slot 25 in the connector 23 before being connected to mounting block 21b in track 5. The connection with mounting block 21b can be a snap fit or a jigsaw type arrangement where the two components are shaped complementary, for example.

Also not shown in FIG. 1, a similar connector 23 can be used between the movable pivots 19 in track 3.

Turning now to FIGS. 3 and 4, the mounting block 21 is shown in more detail.

As will be appreciated, a metal body portion 27 is shaped to be received in a c-section track 3, 5 and is partially encased in plastics skin 29. This arrangement is not dissimilar to that described and claimed in the present applicant's UK patent 2281098. The difference here, however, is that the plastics skin 29 has four cut out regions 31 for receiving metal roller balls 33. The roller balls 33 are sized to be received in a space between the flanges and the base of track 3, 5. The roller ball 33 stand slightly proud of the plastics skin 29, thereby abutting and running along the tracks 3, 5. Smoother running of the mounting blocks along the tracks 3, 5 thereby results. More roller balls 33 could, of course, be used in additional cut outs 31, if necessary.

Each mounting block 21 includes two apertures, 35, 37. One aperture is used to accommodate the pivots 15, and the other aperture is used to connect to the connector 23. Thus, the two mounting blocks 21a, 21b face each other in track 5 with their free apertures facing each other as shown in FIG. 1.

Figure 5:
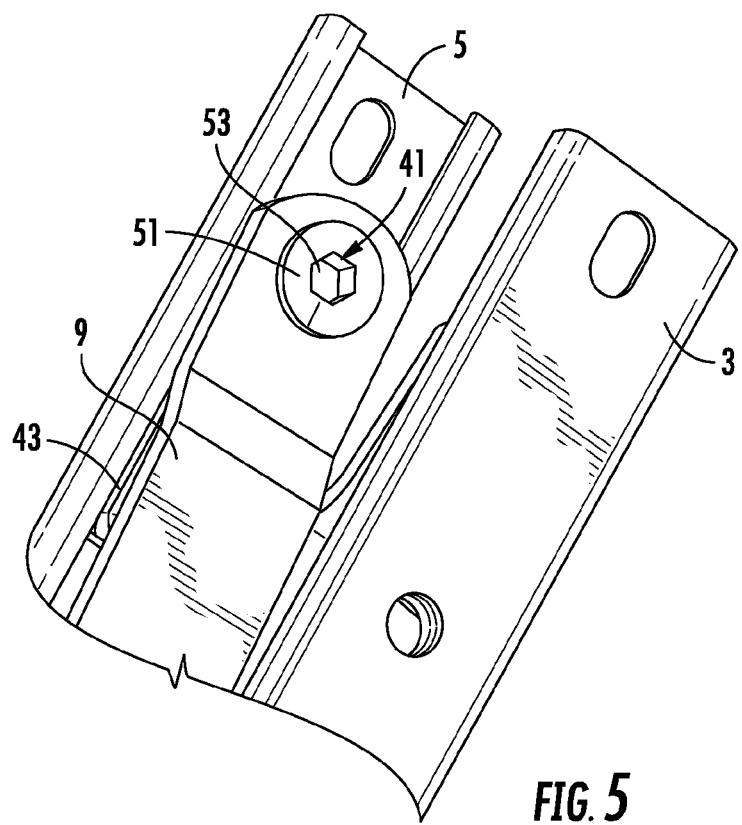
FIG. 5 is a perspective view of part of the parallel opening hinge of FIGS. 1 and 2 showing a pivot mount according to the present invention.
Figure 6:
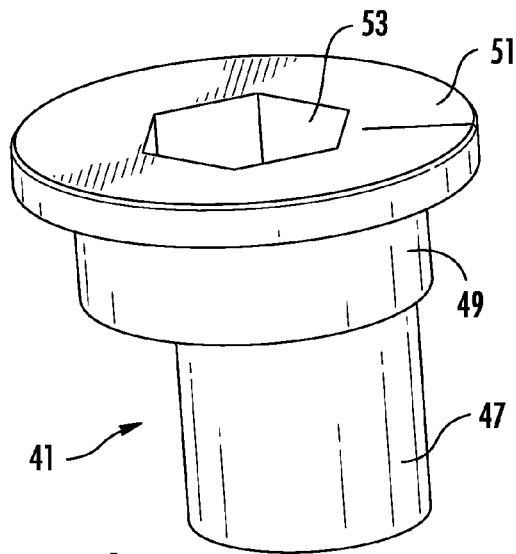
FIG. 6 is a perspective view of a pivot pin for use in the pivot mount shown in FIG. 5.
Figure 7:
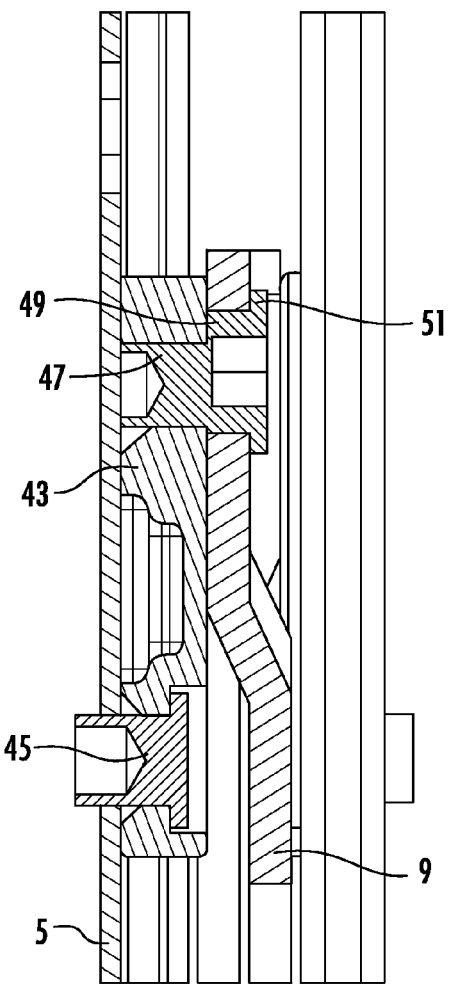
FIG. 7 is a cross-sectional view through the pivot mount shown in FIG. 5.

Moving on to a further inventive aspect of the present parallel opening hinge system, a pivot mount is shown in FIGS. 6 and 7. The pivot mount of FIG. 5 is an enlarged view of the area surrounding pivot 17 in FIG. 1. As will be seen, a pivot pin 41 retains a link 9 on a support block 43, which is fixed within track 5. The support block 43 is fixed to the track 5 by means of a rivet 45 seen more easily in FIG. 1. The pivot pin 41 is fixed to the support block 43, but free to rotate relative thereto about a shaft 47. The pivot pin 41 also includes a cam surface 49 for rebutting an aperture (not shown) in the link 9. A head 51 is provided on the pivot pin to retain the link 9 connected to the support block 43. The head 51 includes a recess 53 for accommodating an alien key or the like to rotate the pivot pin 41 relative to the support block 43.

During installation of a parallel hinge according to the present invention, the sash mounted on the track 5 may drop slightly due to its weight and become non-parallel to the fixed frame, and thereby look unsightly. To overcome this, an alien key can be applied to the recess 53 in the head 51 of each pivot mount to rotate the pivot pin 41 about shaft 49, thereby bringing the cam surface 49 to bear against the link 9. Relative motion of the link 9 and support block 43, and hence track 5 and the sash thereby results, lifting (or lowering) the sash as required. Essentially perfect parallel positioning and alignment of the sash relative to the fixed frame can thereby result.

Figure 8:
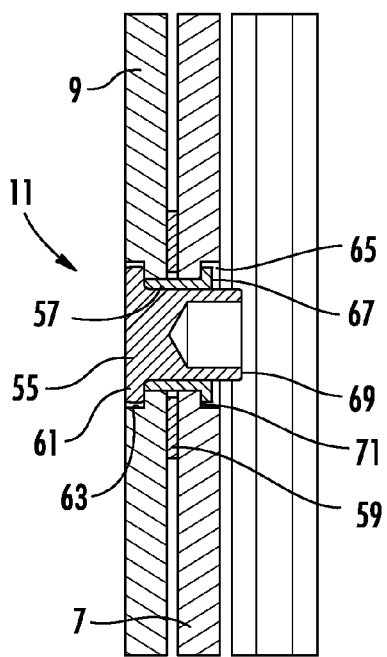
FIG. 8 is a cross-sectional view through a pivot joining crossing links of a parallel opening hinge.

With reference to FIGS. 1 and 8, the pivot 11 between the crossing links 7, 9 comprises a rivet 55, a bush 57 and a nylon washer 59. As will be seen, the rivet has a head 61 accommodated within a recess 63 in link 9 and the fastener passes through the bush 57. The other link 7 also includes a recess 65 for accommodating a shoulder 67 of the bush 57 and the free end 69 of the rivet 55 when crushed over the shoulder 67 of the bush 55. Following crushing of the rivet 55, the rivet is accommodated within the combined thickness of the two links 7, 9 and the washer 59. Further, due to the shoulder 67 of the bush 57 bearing against a surface 71 in the recess 65 of link 7, the location of the bush 57 is defined and the active length of the rivet 55 is fixed due to the axial length of the bush 57. With this in mind, as will be seen in FIG. 8, the free end of the bush 57 abuts the head 61 of the rivet 55, so the distance between the two links 7, 9 can be predefined by choosing the length of the bush 57. The thickness of the nylon washer 59 can also be selected to ensure that the two links 7, 9 are able to rotate freely about the phosphor bronze bush 57 with little axial free play along the rivet 55. An improved pivot joint having less friction is thereby produced, which results in the opening and closing forces of the vent being reduced. Larger and heavier vents can therefore be manually operated.

As will be appreciated, there are a number of novel and inventive features described herein which, when used in a hinge, such as a parallel opening hinge, will result in significantly improved opening and usage of the hinge.

It will of course be understood that the present invention has been described above purely by way of example, and that modifications of detail can be made within the scope of the invention as claimed.

The invention claimed is:

1. A parallel opening hinge comprising a first track, a second track and at least two pairs of pivotally connected crossing links, wherein each pair of crossing links is mounted to the tracks via a fixed pivot and a movable pivot in each track, wherein a connector joins two movable pivots in at least one of the first track and the second track such that the movable pivots move together, wherein the connector is situated and moves within the at least one of the first track and the second track, and wherein the first track and the second track remain parallel to one another throughout a range of movement of the hinge.

2. A parallel opening hinge according to claim 1, wherein the movable pivots comprise slider blocks.

3. A parallel opening hinge according to claim 1, wherein the connector comprises a tie bar attached to the movable pivots.

4. A parallel opening hinge according to claim 1, wherein the connector has slots to accommodate other components within the hinge.

5. A parallel opening hinge according to claim 1, wherein the connector is attached to a movable pivot via a rivet.

6. A parallel opening hinge according to claim 1, wherein the connector is attached to a movable pivot via a shaped connection or snap fit.

7. A parallel opening hinge according to claim 1, wherein the at least one of the first track and the second track has a base and two side walls having inwardly facing flanges substantially parallel to the base.

* * * * *